United States Patent [19]
Meyer

[11] 3,712,125
[45] Jan. 23, 1973

[54] LOAD SIMULATION SYSTEM

[75] Inventor: Walter E. Meyer, Ferndale, Mich.

[73] Assignee: Koehring Company, Milwaukee, Wis.

[22] Filed: Sept. 25, 1970

[21] Appl. No.: 75,493

[52] U.S. Cl. .................................................. 73/90
[51] Int. Cl. ............................................. G01n 3/10
[58] Field of Search .............. 73/90; 318/611, 621, 6

[56] References Cited

UNITED STATES PATENTS

| | | | |
|---|---|---|---|
| 3,583,214 | 6/1971 | Kreiskorte | 73/90 |
| 3,304,768 | 2/1967 | Naumann et al. | 73/90 |
| 2,954,514 | 9/1960 | Hemstreet | 318/621 X |
| 3,523,232 | 8/1970 | Hall et al. | 318/611 |
| 3,187,243 | 6/1965 | Long | 318/6 |

Primary Examiner—Richard C. Queisser
Assistant Examiner—Herbert Goldstein
Attorney—Andrew J. Beck, Charles W. Walton and F. Kristen Koepcke

[57] ABSTRACT

A servo load simulation system incorporating a servo control feed-back loop in combination with an amplitude multiplier and an external amplitude control to provide a gradual rate of increase of an analog command signal to an actuator.

10 Claims, 9 Drawing Figures

ANALOG COMMAND SIGNAL

ADJUSTED COMMAND SIGNAL

EXTERNAL AMPLITUDE SIGNAL

SERVO-LOOP INPUT SIGNAL

INVENTOR.
WALTER E. MEYER
BY Andrew J Beck
ATTORNEY.

LOAD SIMULATION SYSTEM

BACKGROUND OF THE INVENTION

This invention generally relates to load simulation systems and, more specifically, to such systems of the servomechanism type utilized in conventional component testing for repetitively subjecting a test specimen to a predetermined motion or load program.

Load simulation systems are conventionally utilized to apply controlled linear, rotary or bending motion to a specimen to simulate, as nearly as possible, environmental conditions under which the specimen is intended to operate. Typical servomechanism load simulation systems function to perform shock, vibration, fatigue, creep, bending and torsional testing. Basically such servomechanism load simulator systems comprise a hydraulic cylinder actuated by a servo valve generally of the type disclosed in U.S. Pat. No. 2,977,985 to D. W. Ericson et al. which is responsive to a command source signal providing a desired varying load or motion test program. To assure performance as dictated by the command source, a servomechanism control or feed-back loop is provided to measure actual output performance of the hydraulic cylinder and to feed a signal proportional to this output back for comparison with the command source signal. Any deviation from the command source signal by the feed-back signal is sensed by a summation box within the servo system and the deviation is corrected as required.

In operation of such load simulation systems, it is important in securing specimen test accuracy and in guarding load simulation systems against damage that non-programmed, excessive or shock loads not be applied to the specimen being tested. However, it has been found that one source of such non-programmed load is occasioned at test initiation upon application of the varying load program at its peak value. In such a situation, application of the peak value of the varying load program causes a sudden uncontrolled rate of change in the mechanical output of the hydraulic cylinder and thereby imparts an unprogrammed and inconsistent shock load upon the specimen. In some circumstances, such shock load may damage the system. Additionally the resultant stress may either weaken or break the specimen being tested, causing it to fail prematurely, and thereby result in unreliable test data. Such inconsistent and inaccurate test data are worthless as being predictors of expected performance for a given environment and for a typical product.

BRIEF SUMMARY OF INVENTION

Generally it is an object of the present invention to provide a servomechanism load simulation system that circumvents or minimizes the problems heretofore noted. More specifically, it is an object of the present invention to minimize or eliminate any application of non-programmed loads by a servomechanism load simulation system upon start-up which may damage the system or cause premature failure of the specimen being tested.

In achieving these and other objects, as will become apparent hereinafter, one embodiment of the present invention provides for a load simulation system having a motive source for imparting a predetermined load or motion program on a test specimen. A controller responsive to the load or motion program signal controls the motive source. A power source provides the load simulation system with the desired load and/or motion program signal. A signal modulating device operatively connected to the load simulation system regulates initial power source signals to control the initial operation of the motive source such that gradual application of the initial stress is applied by the motive source on the test specimen regardless of the magnitude of the initial load or motion program signal or of the initial positioning of the motive means at test inception.

BRIEF DESCRIPTION OF DRAWINGS

In describing the invention reference will be made to the accompanying drawings forming a portion of the instant disclosure wherein.

DETAILED DESCRIPTION OF INVENTION

Figure 1:
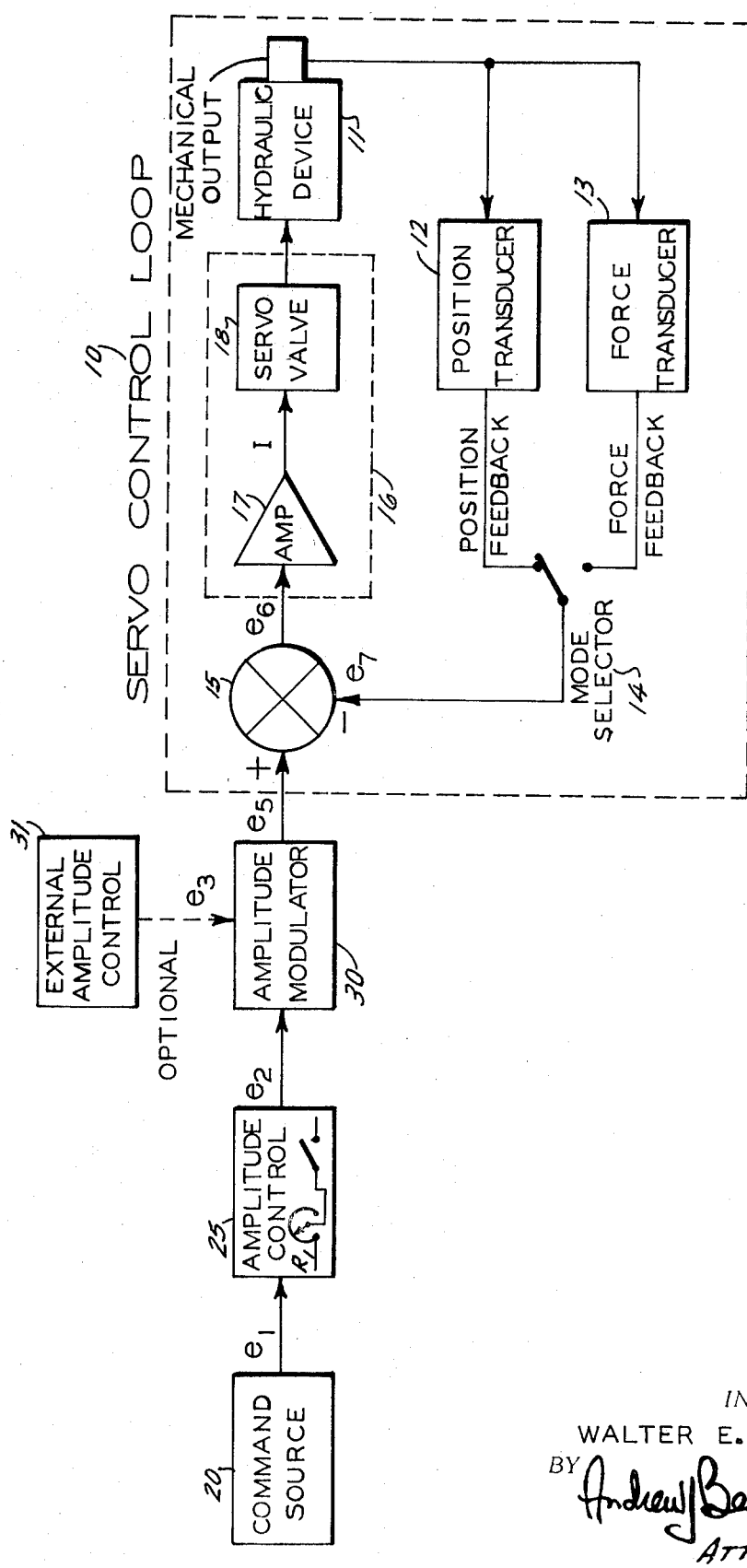
FIG. 1 is diagrammatic or schematic view of a load simulation system according to the present invention.

With reference in more detail to FIG. 1 of the drawing, the present invention is adapted for use with a servomechanism load simulation system of the type manufactured by Pegasus Division of Koehring Company and identified as Model 551 and 552. These systems basically comprise a servo control loop 10 for subjecting a test specimen (not shown) to a predetermined load or motion program as required by a signal from an analog signal generator or command source 20 adapted to be regulated by a signal amplitude control 25.

The servo control loop 10, shown in FIG. 1 is of the conventional type wherein a motive means such as a hydraulic cylinder or servo motor 11 is provided which is adapted to place a stress proportional to the signal voltage from the command source 20 on a test specimen. Actual performance of the hydraulic cylinder 11 is sensed by sensing means such as either of the transducers 12 or 13 depending on the position of a mode selector switch 14. A feedback signal voltage $e_7$ is accordingly generated which is some function of the performance of the hydraulic cylinder 11. The feedback signal voltage $e_7$ is transmitted to a summing device such as a summation box or error indicator 15 which receives and compares it with the servo loop input signal voltage $e_5$. The summation box 15 produces an error signal voltage $e_6$ which corresponds to the difference between the servo loop input signal voltage $e_5$ and feedback signal voltage $e_7$. The error signal voltage $e_6$ operates a controller or control means 16 comprising a signal amplifier 17 and a servo valve 18 which provides electrohydraulic control of the hydraulic cylinder 11. The signal amplifier 17 is of the type which produces an output current proportional to an input voltage signal. The servo valve is disclosed in U.S. Pat. No. 2,977,985 to D. W. Ericson.

Figure 2:
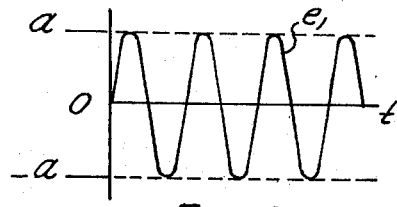
FIG. 2 is a graph of one type of an alternating input command source signal voltage wave form, voltage being plotted against time, adapted to be directed to the servomechanism load simulation system.
Figure 6:
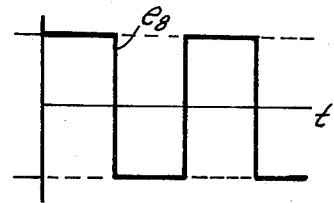
FIGS. 6 through 9 are similar graphs representing alternate voltage signal waveshapes analogous to FIGS. 2 through 5, respectively, according to the instant invention.

The command source 20 illustrated in FIG. 1 is intended to produce either a mechanical, hydraulic or electrical command signal. The instant embodiment provides an electrical programmed analog command source signal voltage which represents any desired mathematical, electrical or mechanical function to achieve either a continuous or non-continuous series of events as represented by $e_1$ shown in FIGS. 1 and 2. Other voltage wave forms such as $e_8$ shown in FIG. 6 may be introduced by the command source 20 to obtain a desired mechanical output program at the hydraulic cylinder 11 for applying a different load magnitude or movement cycle to the test specimen. The amplitude control 25 shown in FIG. 1, such as a potentiometer, is provided for manual control for establishing the maximum amplitude level of the command source signal voltage $e_1$ as desired for test purposes.

In operation, upon application of the command source signal voltage $e_1$ at its peak value in the servomechanism load simulation system herein described, the resultant and sudden uncontrolled rate of change in the mechanical output of the servo control loop 10 may break or weaken the test specimen thereby precipitating premature failure. Such failure results in unusable test data as well as additional testing expense attendant the re-running of the experiment.

To circumvent the problems heretofore noted, the present invention provides a gradual and uniform application of command source signal within a load simulation system which incorporates an amplitude modulator 30 with an external amplitude control 31 between the amplitude control 25 and the servo loop 10 heretofore described. The amplitude modulator 30 is a signal modulating means such as a multiplier of a type well known in the electrical industry, one such typical device being a four quadrant multiplier Model 426 as manufactured by Analog Division of Massachusetts.

Figure 3:
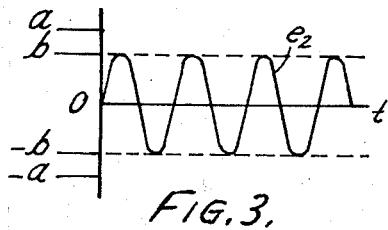
FIG. 3 is a graph of the adjusted command source signal voltage wave form as modified by an amplitude control included in the system in FIG. 1.
Figure 7:
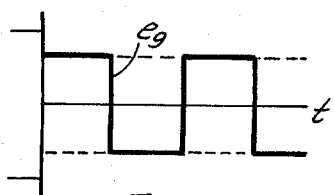

The amplitude modulator 30 is adapted to receive at least two input signal voltages $e_2$ and $e_3$ and to send at least one output voltage $e_5$ as illustrated in FIG. 1. The adjusted command signal voltage $e_2$ which varies in magnitude from $b$ to $-b$ at a given point of time as shown in FIG. 3 is directed from the amplitude control 25 to the amplitude modulator 30. The external amplitude signal voltage $e_3$ is supplied to the amplitude modulator 30 by an external amplitude control 31 of the type commonly known as a variable electronic ramp generator.

Figure 4:
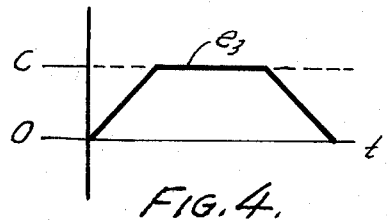
FIG. 4 is a graph of the external amplitude signal voltage wave form which is adapted to be superimposed upon the adjusted command source signal voltage in the amplitude modulator according to the instant invention.
Figure 8:
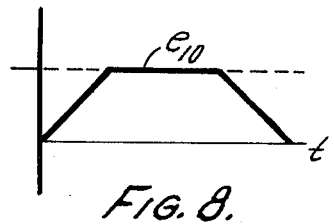

The external amplitude signal voltage $e_3$ consists of a signal waveshape similar to that shown in FIG. 4 defining a linear ramp function varying in magnitude from O to C at a given point of time between initiation and interruption of the command source signal voltage $e_1$. Signal voltage inputs $e_2$ and $e_3$ are electrically multiplied resulting in an output signal or servo loop input signal voltage $e_5$ proportional to the product of signals $e_2$ and $e_3$ similar to that shown in FIG. 5 wherein $e_5$ varies in magnitude from $bc/x$ to $-bc/x$, $x$ being a constant divisor of the amplitude modulator 30. By providing a ramp function waveshape $e_3$ as illustrated in FIG. 4, a controlled rate of initiation of command source signal voltage $e_1$ is automatically obtained irrespective of the voltage values of the command source and adjusted command source signal voltages $e_1$ and $e_2$, respectively, as illustrated in FIGS. 2 through 9.

Figure 5:
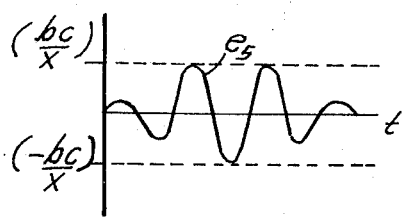
FIG. 5 is a graph of the servo loop input signal voltage wave form adapted to be directed by the amplitude modulator to the servo control loop.
Figure 9:
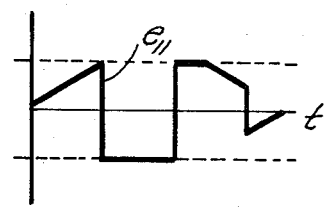

In operation the command source 20 in FIG. 1 produces a programmed analog command source signal voltage $e_1$ which is a function of the desired mechanical program output at the hydraulic cylinder 11. The command source signal voltage $e_1$ is fed into the amplitude control 25 wherein a potentiometer may be adjusted manually by an operator to obtain an adjusted command source signal voltage $e_2$ as desired for test purposes. Instead of directing the resulting adjusted command source signal voltage $e_2$ directly to the servo control loop 10 as was heretofore the practice in industry, the present invention contemplates routing $e_2$ directly to an amplitude modulator 30 with an external amplitude control signal voltage $e_3$ wherein both $e_2$ and $e_3$ are simultaneously multiplied to yield a controlled initiation rate of servo loop control signal voltage $e_5$ as illustrated in FIG. 5 irrespective of the voltage value of $e_1$ and $e_2$ shown in FIGS. 2 and 3. A conventional servo control loop 10 receives the servo loop control signal voltage $e_5$ and compares it with feedback voltage $e_7$ from the transducers 12 and 13 and transmits a resultant error signal voltage $e_6$ to drive the controller 16 which in turn controls the linear or rotary output of the hydraulic cylinder 11 on a test specimen for a given test program.

In summary it should be appreciated by one skilled in the art that the present invention provides an external amplitude control and an amplitude modulator for regulating initial command source signals to control the initial operation of the motive means such that a gradual application of the initial stress applied by the motive means results on the test specimen regardless of the magnitude of the initial load or motion program signal or of the initial positioning of the motive means at test inception. Test accuracy and safeguarding of the test specimen and load simulation system are consequently assured with regard to the elimination of non-programmed, excessive or shock loads by inclusion of this new feature.

It will be apparent that various details of the illustrated form of the present invention may be varied without departing from the inventive concept. It will accordingly be understood that it is intended to embrace within the scope of this invention such modifications as may be embraced by the skill of the art.

Having thus described my invention, what I claim is new and desire to secure by Letters Patent in the United States is:

1. In a load simulation system for testing a specimen comprising:
    a motive means to stress a specimen to be tested:
    a control means operatively connected to the motive means for controlling the motive mean;
    a power source operatively connected to the control means for supplying the control means with a desired load and/or motion program signal;

the improvement comprising a signal controllable, signal amplitude modulating means operatively connected to the power source and the control means for modulating and limiting the amplitude of initial power source signals in accordance with a signal having predetermined amplitude characteristics to control the initial operation of the motive means such that a gradual application of the initial stress applied by the motive means results on the specimen regardless of the magnitude of the initial load or motion program signal or of the initial positioning of the motive means at test inception.

2. A load simulation system according to claim 1 further including a sensing means operatively connected to the motive means for measuring the actual load and/or motion applied to the specimen by the motive means; and a summing device operatively connected to said sensing means and the control means for comparing the actual load and/or motion measured by said sensing means with the desired load or motion program signal supplied by the power source and for correcting the control means accordingly to obtain the desired load or motion program on the test specimen.

3. A load simulation system according to claim 2 wherein said sensing means are feedback transducers and wherein said summing means is a summation box of error indicator.

4. A load simulation system according to claim 2 wherein the control means comprises an amplifier operatively connected to a servo valve, said amplifier receiving a signal from said summing device and sending a proportional output signal to said servo valve which directs the motive means accordingly.

5. A load simulation system according to claim 1 wherein the power source is an analog signal generator which provides a time varying control signal input to the load simulation system.

6. A load simulation system according to claim 1 wherein said modulating means comprises a multiplier and an external amplitude control, said multiplier superimposing the signal of said external amplitude control upon said program signal to yield a gradual application of the resultant signal to the servo control loop.

7. A load simulation system according to claim 1 wherein the motive means is a servo motor or hydraulic cylinder adapted to receive signals from the power source.

8. In a load simulation system for testing specimens comprising:
a motive means to stress a specimen to be tested;
a control means operatively connected to the motive means for controlling the motive means;
a power source operatively connected to the control means for supplying the control means with a desired load and/or motion program signal;
the improvement comprising a signal amplitude modulating means operatively connected to the power source and the control means for modulating and limiting initial power source signals to control the initial operation of the motive means such that a gradual application of the initial stress applied by the motive means results on the specimen regardless of the magnitude of the initial load or the motion program signal or the initial positioning of the motive means at test inception,
said modulating means comprising,
a multiplier, and
an external amplitude control providing a time varying signal,
said multiplier superimposing the signal of said external amplitude control upon said program signal to yield a gradual application of the resultant signal to the control means.

9. In a load simulation system for testing specimens comprising:
a command source for providing a programmed command source signal voltage directly proportional to a desired load or motion program;
an amplitude control operatively connected to the command source with provision for receiving and adjusting command source signal voltage;
a motive means for providing a test specimen with a controlled linear, bending or rotary motion which is responsive to a given motion or load program;
a servomechanism control loop operatively connected to the amplitude control for receiving adjusted command source signal voltage therefrom and for driving the motive means at a desired load or motion program;
the improvement comprising an amplitude modulator and an external amplitude control operatively connected between the amplitude control and the servomechanism control loop for regulating initial command source signals to control the initial operation of the motive means such that a gradual application of the initial stress applied by the motive means results on the specimen regardless of the magnitude of the initial load or motion program signal or of the initial positioning of the motive means at test inception, wherein
said external amplitude control supplies a ramp function waveshape to the amplitude modulator and wherein
said amplitude modulator is a multiplier, said multiplier superimposing the signal of said external amplitude control upon the signal of the amplitude control to yield a gradual application of the resultant signal to the servo control loop.

10. A method of operating a load simulation system for testing a specimen comprising:
subjecting the test specimen to a desired linear, rotary or bending motion program utilizing a motion program signal;
measuring the actual motion program placed on the test specimen;
comparing the actual motion program with the desired motion program;
correcting the actual motion program to conform with the desired motion program;
the improvement comprising the step of controlling the rate of application of the desired motion program on the test specimen by multiplying the motion program signals by a predetermined ramp function for gradually applying initial stress on the test specimen regardless of the magnitude of an initial load or an initial motion program signal or an initial positioning of the motive means of the load simulation system at test inception.

* * * * *